(12) United States Patent
Blanchard (10) Patent No.: US 7,669,702 B2
(45) Date of Patent: *Mar. 2, 2010

(54) TRANSMISSION BOX FOR A WHEELED MACHINE PARTICULARLY OF THE WALKING TYPE

(75) Inventor: Robert Blanchard, Le Boupere (FR)

(73) Assignee: France Reducteurs, Les Herbiers (FR)

( * ) Notice: Subject to any disclaimer, the term of this patent is extended or adjusted under 35 U.S.C. 154(b) by 554 days.

This patent is subject to a terminal disclaimer.

(21) Appl. No.: 11/432,478

(22) Filed: May 12, 2006

(65) Prior Publication Data

US 2007/0000348 A1 Jan. 4, 2007

(30) Foreign Application Priority Data

May 13, 2005 (FR) .................................... 05 04854

(51) Int. Cl.
*F16D 21/00* (2006.01)
(52) U.S. Cl. ............................. 192/50; 74/650; 180/76
(58) Field of Classification Search ................. 74/650;
192/50; 180/76
See application file for complete search history.

(56) References Cited

U.S. PATENT DOCUMENTS

| | | | | | |
|---|---|---|---|---|---|
| 1,197,802 | A | * | 9/1916 | De Laney | 192/69.63 |
| 1,597,198 | A | * | 8/1926 | Howell | 192/69.81 |
| 2,554,346 | A | * | 5/1951 | Reid | 188/83 |
| 3,306,406 | A | * | 2/1967 | Poliseo | 192/46 |
| 3,359,803 | A | * | 12/1967 | Long | 74/650 |
| 3,651,906 | A | * | 3/1972 | Slator et al. | 192/35 |
| 3,888,137 | A | * | 6/1975 | Brieten | 74/650 |
| 4,103,564 | A | * | 8/1978 | Caldwell | 74/650 |
| 4,153,964 | A | | 5/1979 | Klug | |
| 4,289,224 | A | * | 9/1981 | Dobberpuhl | 192/50 |
| 6,182,784 | B1 | * | 2/2001 | Pestotnik | 180/376 |
| 6,655,515 | B2 | * | 12/2003 | Cox et al. | 192/38 |
| 7,210,567 | B2 | * | 5/2007 | Cibien | 192/48.8 |
| 2003/0089570 | A1 | * | 5/2003 | Ochab et al. | 192/50 |
| 2003/0155204 | A1 | | 8/2003 | Demir et al. | |
| 2006/0289225 | A1 | * | 12/2006 | Blanchard | 180/337 |

FOREIGN PATENT DOCUMENTS

| | | |
|---|---|---|
| EP | 0 298 016 | 1/1989 |
| EP | 0 782 820 | 7/1997 |
| EP | 1 198 981 | 4/2002 |
| FR | 2683283 A1 * | 5/1993 |
| GB | 17903 | 0/1914 |
| GB | 2130315 A * | 5/1984 |
| JP | 60-188654 | 9/1985 |

* cited by examiner

*Primary Examiner*—Richard M. Lorence
(74) *Attorney, Agent, or Firm*—Young & Thompson (57) ABSTRACT

A transmission box (3) for a wheeled machine includes a motor input shaft (4) driving a drive wheel (8) to actuate at least one drive shaft (9A, 9B) of at least one wheel (2A, 2B) of the machine (1). A clutch mechanism (13) is disposed between the drive wheel (8) and a drive shaft (9A, 9B) and is actuated by driving in rotation the drive wheel (8) and deactuated by driving in rotation the drive shaft (9A, 9B) when the motor input shaft (4) is stopped or when the speed of rotation of the drive shaft (9A, 9B) is greater than the speed of rotation of the drive wheel (8). The box (3) contains two clutch mechanisms (13), each coacting with one drive shaft (9A, 9B) to permit the free wheeling of one and/or the other of a pair of wheels (2A, 2B).

13 Claims, 6 Drawing Sheets

TRANSMISSION BOX FOR A WHEELED MACHINE PARTICULARLY OF THE WALKING TYPE

BACKGROUND OF THE INVENTION

The present invention relates to a transmission box for a wheeled machine, particularly of the walking type, of the type comprising, disposed at least partially within the box, a motor input shaft driving a drive wheel to actuate at least one drive shaft of at least one wheel of the machine, a clutch mechanism being disposed between the drive wheel and the drive shaft for the wheel of the machine, this clutch mechanism being activated by driving in rotation the drive wheel and deactivated by driving in rotation the drive shaft of the wheel when the motor input shaft is stopped or when the speed of rotation of the drive shaft of the wheel is greater than the speed of rotation of the drive wheel, as well as a wheeled machine provided with such a transmission box.

Transmission boxes of the mentioned type are well known to those skilled in the art as shown in particular by the patent EP 1 198 981. Such boxes include a clutch, so-called automatic, which does not require for its operation a dedicated control member, such as a fork, as is the case in conventional clutches of the type as that described in EP 0 782 820.

Independently of the required clutch mechanism, there is also provided particularly in the case of machines, such as self-propelled lawnmowers with driven rear wheels, to provide each free end of the drive shaft of the wheels, with a mechanism generally with a ratchet or clutch so as to permit, in particular during turning the machine, a free wheel function of one of the wheels of the same pair of wheels of the machine. Each wheel is thus disconnectable from the drive shaft for the wheels as shown in particular in the patent EP 0 298 016. However, as the clutch mechanism is positioned between the output shaft of the gearbox and the assembly of wheels, it is necessary, in order to permit the wheels to turn at different speeds during turns, to provide each wheel with such a mechanism. The result is an increase in cost. Moreover, the presence of a clutch mechanism adjacent the wheels gives rise to premature wear of the mechanism subjected particularly to dirt and projections of ground connected with the proximity to the wheels.

There is also known, from the patent JP 60-188654, a device for transmission with two clutches. In this device, the box is a box with an open rotatable body, driving a drive wheel. This box is disposed between two fixed plates which form ends of the box. Rolling members are inserted between the plates and the body of the box. The result is a particularly complicated structure.

SUMMARY OF THE INVENTION

An object of the present invention is thus to provide a transmission box of the mentioned type whose design permits the wheels to turn at different speeds, and particularly during turns, without having to provide the ends of the drive shaft of the wheels of the machine with a supplemental mechanism.

Another object of the present invention is to provide a stationary transmission box whose design permits this latter to serve simultaneously the function of clutch reducing mechanism and of a differential, in the sense that the wheels can turn at different speeds particularly during turns.

To this end, the invention has for its object a transmission box for wheeled machines, particularly of the walking type, of the type comprising, disposed at least partially within the stationary box, an input motor shaft driving a drive wheel to actuate at least one drive shaft of at least one wheel of the machine, a clutch mechanism being disposed between the drive wheel and the drive shaft of the wheel of the machine, this clutch mechanism being actuated by driving in rotation the drive wheel and deactuated by driving in rotation the drive shaft of the wheel when the input shaft of the motor is stopped or when the speed of rotation of the drive shaft of the wheel is greater than the speed of rotation of the drive wheel, each wheel drive shaft being inactivated from the corresponding clutch mechanism, free to turn in any direction of rotation, characterized in that the box contains, on opposite sides of the drive wheel, two clutch mechanisms each coacting with a drive shaft of the wheel of the machine to permit the free wheeling of one end or the other wheel of a pair of wheels of the machine.

The integration into the transmission box serving as a reducing mechanism, of a second clutch, permits the transmission box, which is a stationary box in operating position of the transmission, to play a role equivalent to that of a differential, in the sense that the wheels can turn at different speeds during turning thanks to the fact that the drive shaft of the wheels is no longer in the form of a single piece shaft but is constituted by two half shafts each adapted to permit driving one wheel, each shaft being provided with its own clutch mechanism, each mechanism coacting with a same drive wheel. The clutches are disposed within a same stationary box positioned in the connection region of the two assembled half shafts, this connection region being generally located substantially a quarter of the total length of the shaft that is formed, such that the risk of premature wear of the mechanisms disposed within this box because of projections and dirt, are reduced.

According to a preferred embodiment of the invention, each clutch mechanism is actuated by driving in rotation the drive wheel and axial movement of at least one member on said wheel drive shaft, this axially movable member on or along the wheel drive shaft carrying at least one ramp coacting with a member secured in rotation with said shaft to permit, in the clutching phase, the securement in rotation between the ramp or ramps of the movable member and the piece fixed in rotation with the wheel drive shaft, and accordingly the transmission of the rotational movement of the member to the wheel drive shaft, and in an unclutching phase, the disconnection between the ramp or ramps of the movable member and the piece secured in rotation to the shaft.

The invention also has for its object a wheeled machine, preferably of the walking type, such as a lawnmower, characterized in that it is provided with a transmission box of the mentioned type.

BRIEF DESCRIPTION OF THE DRAWINGS

The invention will be better understood from a reading of the following description of embodiments, with reference to the accompanying drawings, in which.

DETAILED DESCRIPTION OF THE DRAWINGS

As mentioned above, the transmission box according to the invention is more particularly adapted to be applied to wheeled machines 1 particularly of the walking type.

Figure 1:
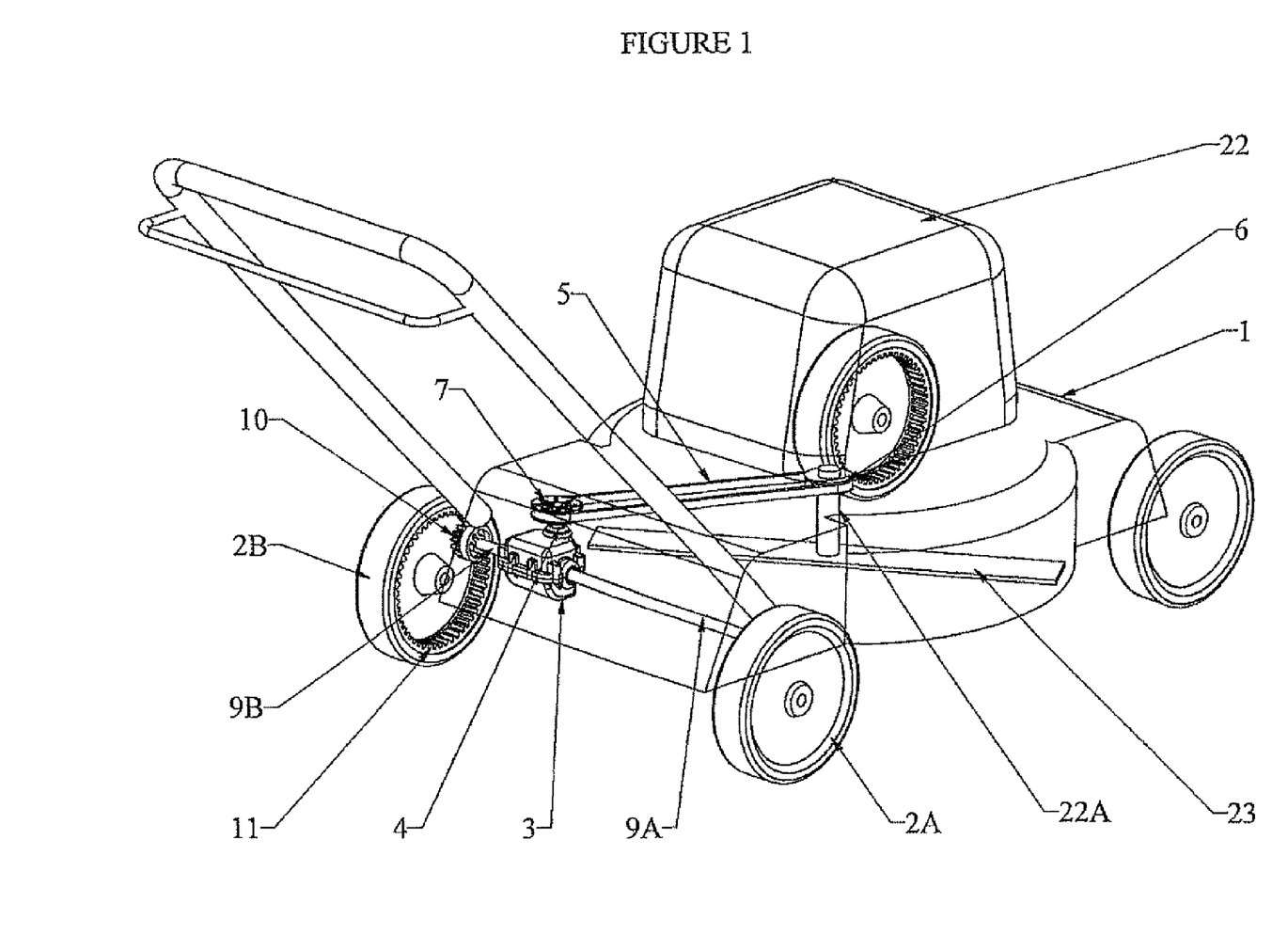
FIG. 1 is a schematic assembly view of a wheeled machine, in this case a lawnmower, provided with a transmission box according to the invention.

FIG. 1 shows the application of such a transmission box to a lawnmower. This lawnmower comprises a wheeled chassis, the rear wheels of the chassis being shown at 2A, 2B in the drawings. The machine has a motor 22. The output shaft 6 of the motor carries on the one hand a cutting blade 23, on the other hand a drive pulley 6 connected by means of a belt 5 to a driven pulley 7. This driven pulley 7 is itself mounted on a motor input shaft 4 adapted to be disposed at least partially in the transmission box 3 according to the invention. This motor input shaft 4 drives in rotation a drive wheel 8 disposed within the box and positioned coaxially to a drive shaft 9A, 9B of wheels 2A, 2B. This wheel 8 is adapted to actuate at least one drive shaft 9A, 9B of at least one wheel 2A, 2B of the machine. In this arrangement, the motor input shaft 4 is positioned substantially orthogonally to the drive shafts 9A, 9B of a wheel 2A, 2B of the machine. A clutch mechanism 13 is disposed in each instance between the drive wheel 8 and the shaft 9A, 9B of the machine wheel 2A, 2B. Thus the drive wheel 8 is inserted between two clutch mechanisms 13, each mechanism 13 being carried by a drive shaft 9A or 9B of a wheel 2A or 2B of a same pair of wheels of the machine. At the ends of the drive shafts 9A, 9B of the wheels, projecting from the transmission box 3, is disposed in each instance a pinion 10 adapted to engage with a pinion 11 carried by each wheel 2A, 2B of the machine. Of course, other transmission means for the movement of drive shaft 9A, 9B to the wheel 2A, 2B, can be provided without departing from the scope of the invention.

Each clutch mechanism 13 is actuated by the driving in rotation of the drive wheel 8. This driving in rotation of the drive wheel 8 is achieved after tensioning the belt 5 which permits the transmission of the movement of the drive pulley 6 to the driven pulley 7 and accordingly the transmission of the movement of rotation of the motor input shaft 4 which itself transmits its movement to the drive wheel 8. The tension in the belt 5 can be obtained either with the help of a tensioning roller, or by rotation of the assembly of the transmission box 3 about the axis passing through drive shaft 9A, 9B of wheel 2A, 2B or else by another equivalent means adapted to ensure tension in the belt 5. It is to be noted that such a belt transmission 5 can also serve as a speed changer when the drive and driven pulleys are provided with flanks adapted to be brought together or spaced apart from each other so as to vary the speed of driving in rotation of the motor input shaft 4. This motor input shaft 4 can be constituted by an endless screw or a cylindrical-conical pinion. The teeth of the screw or pinion are adapted to coact with the teeth of the toothed drive wheel 8.

The deactivation of the clutch mechanisms 13 is obtained by driving in rotation the shaft 9A or respectively 9B which drive the wheel, when the motor input shaft 4 is stopped. Thus, in the course of stopping the motor input shaft 4, the inertia of the machine gives rise to the movement of the machine by a value sufficient to drive in rotation the drive shafts 9A, 9B of wheel 2A, 2B of the machine and thus to generate deactuation of the clutch mechanisms 13.

In the same way, each clutch mechanism 13 is designed to be deactivated when the speed of rotation of the drive shaft 9A, 9B of wheel 2A, 2B which carries said mechanism is greater than the speed of rotation of the drive wheel 8.

In the inactivated condition of the clutch mechanism, the wheel of the machine and the half shaft which carries it, can turn freely in both directions of rotation. Moreover, each wheel of a pair of machine wheels can turn independently of the other wheel of the machine.

In a manner characteristic of the invention, as shown in the drawings, the box 3 comprises two clutch mechanisms positioned on opposite sides of the drive wheel 8. Each clutch mechanism 13 coacts with a drive shaft 9A, 9B of wheel 2A, 2B of machine 1, to permit the free wheeling of one and/or the other wheel of a pair of wheels 2A, 2B of machine 1. Thus, and contrary to the state of the art, the drive shaft for the wheels of the machine is no longer constitute by a single and same shaft but in the form of two half shafts represented at 9A and 9B in the drawings. Thus the drive shaft for the wheels of the machine is present in the form of two shafts 9A, 9B, one driving the wheel 2A, the other the wheel 2B of a pair of machine wheels. The drive shafts 9A, 9B for the wheels of pair of machine wheels are thus adapted to turn at different speeds of rotation.

Thanks to the absence of a provision of a single piece drive shaft for the wheels and the presence of two clutch mechanisms, the wheels of a same pair of wheels of the machine can turn at different speeds, particularly during turning.

The clutch mechanism 13 used between the drive wheel and the drive shaft 9A, 9B of a wheel 2A, 2B of the machine, can be of variable design and can thus have a design according to that shown in patent EP 1 198 981.

Generally speaking, the clutch mechanism 13 is actuated by driving in rotation the drive wheel 8 and axial movement of at least one member 15, 15' on said drive shaft 9A, 9B for wheel 2A, 2B, this member 15, 15', movable axially on or along the wheel drive shaft, carrying at least one ramp coacting with a member secured in rotation with said shaft to permit, in the clutching phase, the securement in rotation between the ramp or ramps of the movable member and in the member secured in rotation to the wheel drive shaft, and accordingly the transmission of the rotational movement of the member 15, 15' to the wheel drive shaft, and in an unclutched phase, the disconnection between the ramp or ramps of the movable member and the member secured in rotation to the shaft.

To permit axial movement of the member 15, 15' under the control of the drive wheel 8, the drive wheel 8 and the axially movable member 15, 15' of each clutch mechanism 13 carry, on their facing surfaces, ramps 14, 16, 16' which coact, during the clutching phase, for axial movement of the movable member 15, 15' in a first direction of securement with the drive shaft 9A, 9B of the wheel 2A, 2B. These ramps 14, 16, 16' are constituted by at least one of the flanks of the projecting teeth or crenalations of said surfaces.

Preferably, each tooth of the drive wheel 8 or of the axially movable 15, 15' is an asymmetric tooth. Thus, each tooth of the drive wheel 8 or of the axially movable member 15, 15' comprises a flank 14A, 16A parallel to the axis of rotation of the drive shaft 9A, 9B of the wheel 2A, 2B and an inclined flank 14B, 16B, forming a ramp, adapted to give rise to relative axial displacement of the drive wheel 8 and the axially movable member 15, 15'. The production of these teeth, in the form of asymmetric teeth, permits the drive wheel 8 not to cause axial movement of the movable member 15, 15' during driving in a rearward direction of the toothed wheel. Such a movement could be obtained particularly during reversal of the electrical connection of the motor. The shape of the teeth is thus fundamental to permit observing respect the safety rules.

Moreover, the inclined flank 14B, 16B of the tooth forming a ramp of the drive wheel 8 or of the movable member 15, 15' is prolonged in a direction of the summit of the tooth by a portion 14C, 16C of a flank extending parallel to the axis of rotation of the drive shaft 9A, 9B of the wheel. This toothed portion 14C or 16C in prolongation of the active portion of said tooth, which is to say which controls axial movement of the movable member 15, 15', is the reverse of an inactive portion which generates no axial movement of the member 15, 15'. There is thus avoided the generation of a permanent too great axial force on the member 15, 15' at the risk of having to reinforce the assembly of the construction, and particularly the mechanical resistance of the box.

Figure 9:
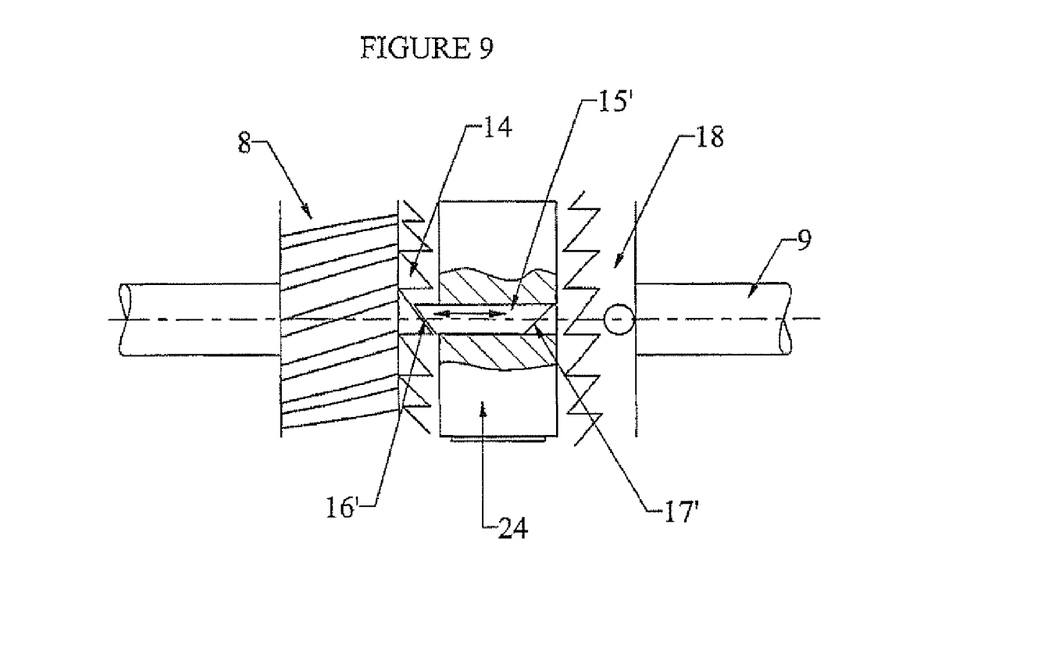
FIG. 9 is a cross-sectional view of another embodiment of a transmission box according to the invention.
Figure 10:
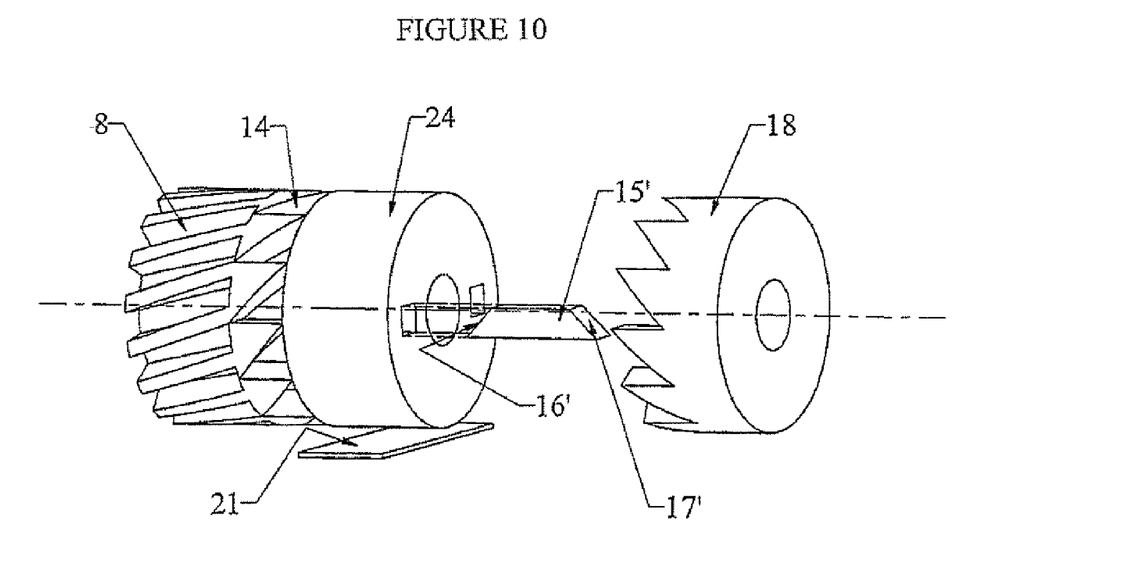
FIG. 10 is a perspective detailed view of the elements constituting a transmission box according to the embodiment of the invention shown in FIG. 9.

According to a first embodiment of the invention, shown in FIGS. 9 and 10, the axially movable member 15, 15' is a pin 15' guided to move within a bore of a plate 24 mounted on the drive shaft 9A, 9B of the wheels and disposed between drive wheel 8 and member 18 secured in rotation to the shaft 9A, 9B, the longitudinal axis of said bore being substantially parallel to the axis of said wheel drive shaft 9A, 9B. This pin 15' is provided with a side of ramps 16', adapted to coact with the ramps 14 of the drive wheel 8 to cause axial displacement of said pin 15' and on the other hand, of ramps 17', adapted to coact with the member 18 or 19 secured in rotation with the drive shaft 9A, 9B of the wheel 2A, 2*b* so as to cause driving in rotation of said shaft 9A, 9B. Of curse, the plate 24 can be provided with one or several axially movable members 15'. In FIGS. 9 and 10, only one side of the clutch mechanism 13 according to the invention is shown.

However, for reasons of simplicity of the clutch mechanism, the design which will be described below is preferred.

Thus, according to a particular embodiment of the invention, the drive wheel 8 has on each of its surfaces ramps 14 coacting with complementary ramps 16 carried by a clutch plate 15 mounted freely in rotation on drive shaft 9A, 9B of wheel 2A, 2B and movable axially under the action of said ramps 14, 16. This plate 15 is itself during these movements adapted to be coupled to or uncoupled from a member 18, 19 secured to the drive shaft 9A, 9B of wheel 2A, 2B.

Thus within a same transmission box, there is provided, carried each time by a drive half shaft 9A, 9B of a wheel 2A, 2B of the machine, a member 18, 19 secured to the drive shaft 9A or 9B of a wheel 2A or 2B, a clutch plate 15, the drive wheel being inserted between two assemblies constituted by a member 18, 19 and by the clutch plate so as to coact each time with said clutch plate.

Because of the permanent radial force exerted by the drive wheel 8 on the half shafts 9A, 9B, the blocks 3 comprises, disposed in line with the drive wheel 8, within said wheel 8, in the region of connection of the drive shafts 9A, 9B of the wheel, a pair of wheels also called half shaft 9A, 9B, means 12, 23, 24 for holding in aligned position drive shafts 9A, 9B of the wheel, these shafts 9A, 9B being, in the position of being held in alignment, adapted to be driven relative to rotational movement.

The means for holding in aligned position the half shafts 9A, 9B are constituted either by a connection member, such as an axle 12 or a sleeve 24 coacting by nesting with the free end to be held aligned of each half shaft 9A, 9B, or by complementary geometric shapes of the free ends to be held aligned of the half shafts 9A, 9B, these geometric shapes permitting mounting in nested relationship and free rotation the two half shafts 9A, 9B relative to each other.

Figure 2:
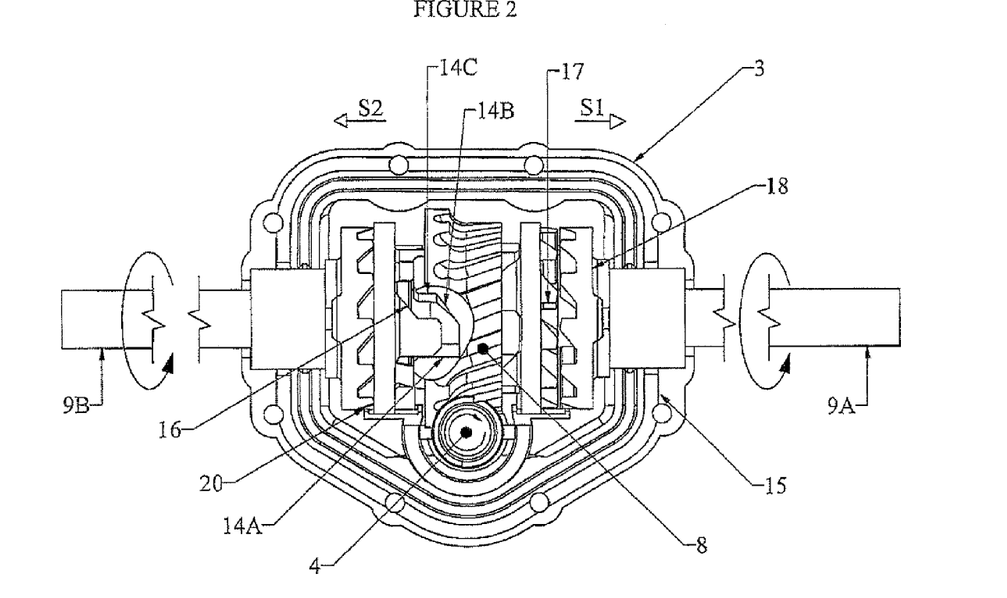
FIG. 2 is a top plan view of a transmission box in the open condition of this latter, one of the mechanisms being represented in the engaged clutch position, the other in the unclutched position.
Figure 3:
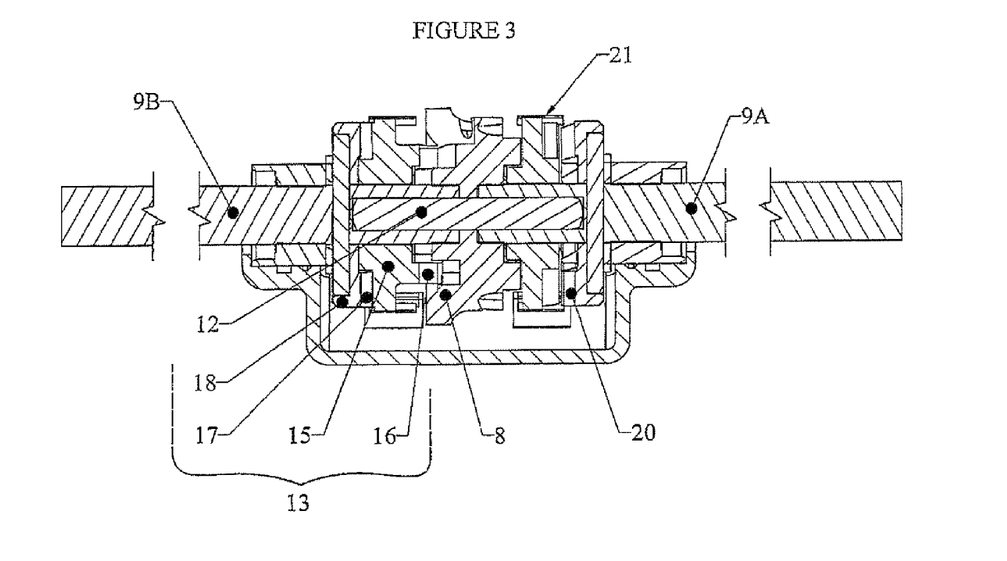
FIG. 3 is a cross-sectional view of the elements of the transmission box, half of the box having been shown.
Figure 4:
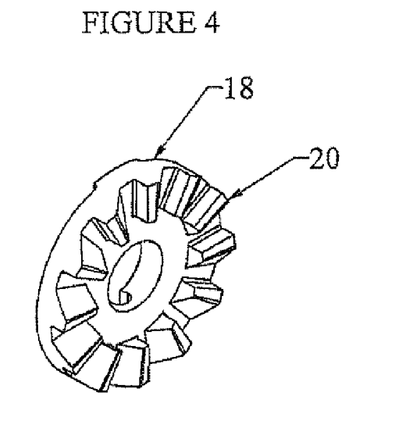
FIGS. 4 and 5 are perspective views of a wheel secured in rotation with the wheel drive shaft.
Figure 5:
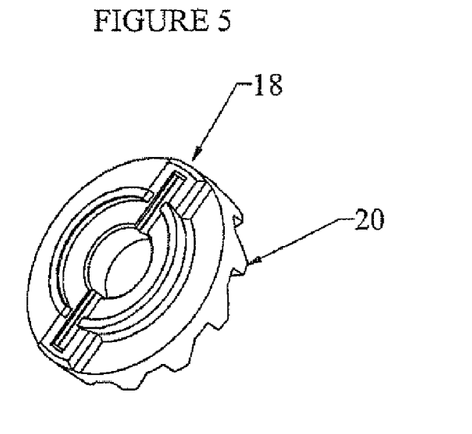
Figure 6:
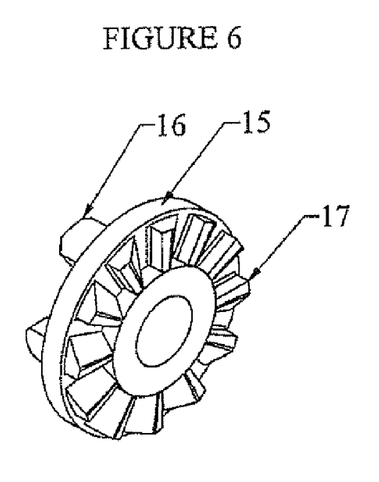
FIGS. 6 and 7 are perspective views of the clutch plate of the transmission box.
Figure 7:
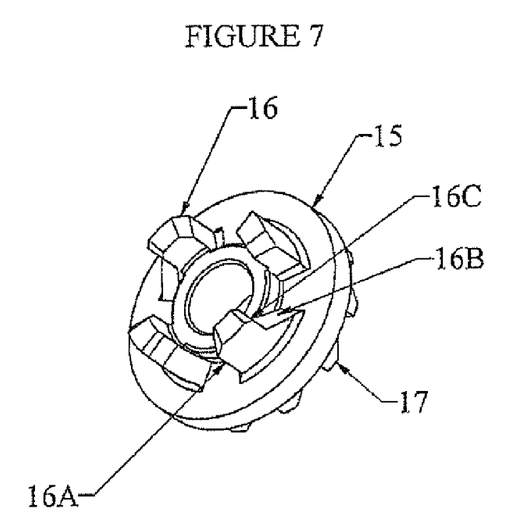

It will be seen, in the example shown in FIG. 3, that each drive shaft 9A, 9B of a wheel 2A or 2B of a pair of machine wheels, also called half shaft 9A or 9B, has within the box a hollowed end engaged, freely in rotation, on a connection axle 12 carrying freely in rotation the drive wheel 8. The toothed drive wheel 8 is thus positioned in the connection region of the two half shafts to each other within the box 3. The clutch plate 15, then a member 18, 19 secured to the wheel drive shaft 9A or 9B, are each time positioned on one side or the other of said drive wheel 8 to obtain an assembly according to that shown in FIG. 2, 3 or 8.

Figure 11A:
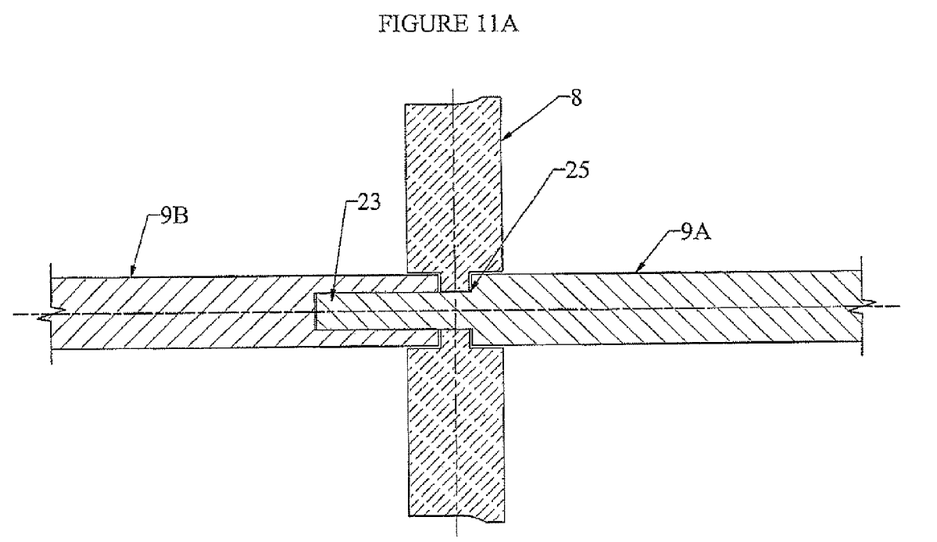
FIGS. 11A and 11B are cross-sectional views of two embodiments of the means for holding the wheel drive shafts in aligned position.
Figure 11B:
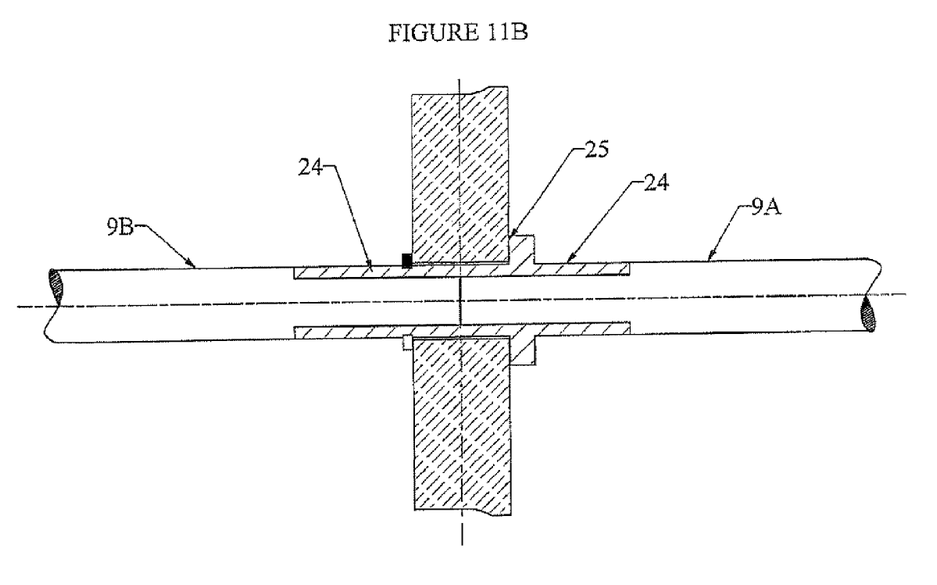

In another embodiment, corresponding to that shown in FIG. 11B, for holding in the line position the half shafts, each half shaft 9A, 9B has, at one of its ends, a bearing engaging in a sleeve 24 for connecting the half shafts together, the drive wheel 8 being freely mounted in rotation about said sleeve 24.

In the example shown in FIG. 11A, for holding in aligned position the half shafts 9A, 9B, one of the half shafts has one end hollowed out, in which is engaged a bearing 23 provided at the end of the other half shaft. Independently of the mode of embodiment used for the holding means, these holding means provide in each instance, at least in the active position corresponding to a position in which they hold the half shafts 9A, 9B aligned, an external peripheral throat 25 for guiding the drive wheel 8 within which said wheel 8 is freely mounted in rotation and axially blocked.

To perfect this guidance, the wheel 8 can be provided with a radial internal circumferential projection as shown for example in FIG. 11A, this projection entering within said throat.

In the example shown in FIG. 11B, the sleeve 24 is shouldered and received a snap clip or a ring to permit delimiting said circular throat 25.

In the examples shown in FIGS. 3 and 11A, the nesting non-joined contact of the two half shafts 9A, 9B permits delimiting, between the facing surfaces of the two half shafts, the throats serving for the reception of the internal radial projection of the drive wheel 8.

As mentioned here, the clutch plate 15 is provided on each of its surfaces with ramps 16, 17. The ramps 16 of one surface of the clutch plate 15 coact, during the clutching phase, with the ramps 14 of the drive wheel 8 for radial movement of the plate 15 in a first direction for securement in rotation of the plate with a wheel 18 carried by the shaft 9A, 9B for driving the wheel 2A, 2B and secured in rotation with this latter. This clutching phase corresponds to that shown in the right hand portion of the box in FIG. 1. The ramps 17 of the other surface of plate 15 coact, during the unclutching phase, with the ramps 20 of the wheel 18 carried by the shaft 9A, 9B for driving the wheel 2A, 2B and secured in rotation with this latter to give rise, by axial movement in the opposite direction of the plate 15, to the free wheeling of the shaft 9A, 9B for driving wheel 2A, 2B. This position corresponds to the left portion of the housing shown in FIG. 2.

It can be seen that the wheel 18 secured in rotation with the shaft 9A for driving the wheel 2A is spaced from the ramps 17 of the clutch plate such that the shaft 9A can be freely driven in rotation. Thus when the machine turns and the wheel 2A corresponds to the wheel positioned on the outside of said turn, the latter can turn at a speed of rotation greater than the wheel 2B whose movement is transmitted by the wheel drive shaft 9B.

Thus, it will be understood, as seen in the drawings, that during driving in rotation of the toothed drive wheel 8 achieved by driving in rotation the motor input shaft 4, the ramps 14 of the toothed drive wheel 8 coact with the ramps 16 of the clutch plate 15 to cause axial movement of the plate 15 freely mounted in rotation and free axially on the wheel 9A or respectively 9B in the direction S1 for the plate 15 positioned to the right of the drive wheel in FIG. 2 or in the direction S2 for the plate positioned at the left of the drive wheel in FIG. 2. In the course of this axial movement, the ramps 17 of the clutch plate 15 come into engagement with the ramps 20 carried by the member 18 secured in rotation to the shaft and fixed axially on said shaft. This coming into engagement gives rise to the transmission of the movement of the toothed drive wheel 8 to the shaft 9A or respectively 9B for driving a wheel of the machine.

When the motor input shaft 4 is stopped, which is to say no longer turns, or when at least one of the shafts, for example shaft 9A, is driven at a speed of rotation greater than the drive speed in rotation of the drive wheel 8, the wheel 18 then tends to move in rotation relative to the clutch plate 15 such that the ramps 20 of the wheel 18 coact with the ramps 17 of the clutch plate 15 to give rise to movement of the clutch plate in a direction opposite to S1 for the shaft 9A or S2 for the shaft 9B.

Accordingly, the result is a stopping of the transmission of movement of the drive wheel to the shaft 9A or 9B for driving a wheel 2A or 2B of the machine, such that this shaft can then turn freely. The unclutching is particularly useful in the phases of backward movement of the engine or in the phases of turning of the engine in which the outer wheel must drive at a higher speed of rotation than the speed of rotation of the inner wheel. This unclutching permits such a drive in rotation at different speeds of the wheels of the same pair of wheels of the machine.

Figure 8:
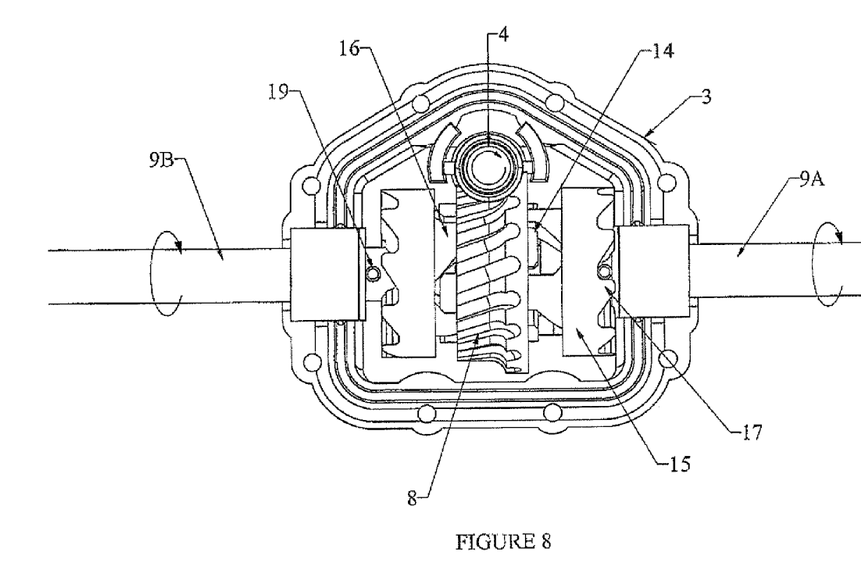
FIG. 8 is a top plan view of another embodiment of a transmission box according to the invention.

In another embodiment according to that shown in FIG. 8, the ramps 16 of one surface of the clutch plate 15 coact, during the clutching phase, with the ramps 14 of the drive wheel 8 for axial movement of the plate 15 in a first direction for securement in rotation of the plate with a pin 19 mounted on the shaft 9A, 9B for driving the wheel 2A, 2B and secured in rotation with this latter, the ramps 17 of the other surface of plate 15 coacting, during the unclutching phase, with the opposite legs of said pin 15 to give rise, by axial movement, in the direction opposite said plate 15, to the free wheeling of the shaft 9A, 9B for driving the wheel 2A, 2B.

As mentioned above, other embodiments of each clutching mechanism can be envisaged without departing from the scope of the present invention.

Preferably, the two clutching mechanisms which were disposed within the box 3 are of identical design. The box has a plane of symmetry passing through the toothed drive wheel 8.

To facilitate and permit the phases of unclutching and clutching, the clutch plate 15 is provided with a brake 21 acting permanently on the angular speed of the plate 15. This brake can be for example constituted by a simple leaf spring adapted to be applied to the edge of the clutch plate 15. This brake thus permits driving in rotation of the clutch plate 15, in particular during phases of clutching and unclutching.

As has been mentioned above, the assembly of the elements, namely the clutch mechanism and toothed wheel, are disposed within a box 3 constituted generally by two half shells assembled on a joint plane, the connection between the two half shells taking place by screwing and/or cementing.

The wheeled machine 1 provided with such a transmission box is characterized by simplicity of manufacture.

What is claimed is:

1. A transmission box (3) for a wheeled machine (1), comprising:
    a motor input shaft (4) disposed at least partially within the transmission box, which is stationary, the motor input shaft (4) driving a drive wheel (8) to actuate at least one drive shaft (9A, 9B) of at least one wheel (2A, 2B) of the machine (1); and
    a clutch mechanism (13) disposed between the drive wheel (8) and the drive shaft (9A, 9B) of the wheel (2A, 2B), the clutch mechanism (13) being actuated by driving in rotation of the drive wheel (8) and deactuated by driving in rotation of the drive shaft (9A, 9B) of the wheel (2A, 2B) when the motor input shaft (4) is stopped or when a speed of rotation of the drive shaft (9A, 9B) is greater than a speed of rotation of the drive wheel (8), each wheel drive shaft being in an inactivated condition of the corresponding clutch mechanism, free to turn in either direction of rotation,
    wherein the transmission box (3) contains, on opposite sides of the drive wheel (8), the clutch mechanism (13) comprising two clutch mechanisms (13) each coacting with one drive shaft (9A, 9B) to permit a free wheeling of one end or the other wheel or both of the wheels (2A, 2B),
    each clutch mechanism (13) is actuated by driving in rotation the drive wheel (8) and axial movement of at least one mobile member (15, 15') on said drive shaft (9A, 9B), the mobile member (15, 15') movable axially on or along the drive shaft (9A, 9B) carrying ramps (17, 17') coacting with a secured member (18, 19) secured in rotation with said drive shaft (9A, 9B) to permit, in a clutching phase, securement in rotation between the ramps (17, 17') of the mobile member (15, 15') and the secured member (18, 19) secured in rotation with the drive shaft (9A, 9B) and then the transmission of the movement of rotation of the mobile member (15, 15') to the drive shaft (9A, 9B), and in an unclutching phase a release of connection between the ramps (17, 17') of the mobile member (15, 15') and the secured member (18, 19) secured in rotation to the drive shaft (9A, 9B), the mobile member (15, 15') including a clutch plate (15) provided with a brake (21) acting permanently on an angular speed of said clutch plate (15) to facilitate and permit the clutching and the unclutching phases,
    the drive wheel (8) and the axially mobile member (15, 15') of each clutch mechanism (13) carry on their facing surfaces, ramps (14, 16, 16') which coact, during the clutching phase, for the axial movement of the mobile member (15, 15') in a first direction for securement with the drive shaft (9A, 9B), said ramps (14, 16, 16') being constituted by at least one of flanks of teeth or crenalations, projecting from said surfaces, and
    each tooth of the driven wheel (8) or of the axially mobile member (15, 15') is an asymmetric tooth.

2. The transmission box (3) according to claim 1,
    wherein each tooth of the drive wheel (8) or of the axially mobile member (15, 15') of the clutch mechanism (13) comprises a flank (14A, 16A, 16'A) parallel to the axis of rotation of the wheel drive shaft (9A, 9B) and an inclined flank (14B, 16B, 16'B) forming a ramp, adapted to give rise to relative axial movement of the drive wheel (8) and the axially mobile member (15, 15').

3. The transmission box (3) according to claim 2, wherein the inclined flank (14B, 16B) of the ramp forming tooth is prolonged in the direction of the summit of the tooth by a flank portion (14C, 16C) extending parallel to the axis of rotation of the drive shaft (9A, 9B).

4. The transmission box (3) according to claim 1, wherein the drive wheel (8) has, on each of the drive wheel's surfaces, ramps (14) coacting with complementary ramps (16) carried by the clutch plate (15) mounted freely for rotation on the drive shaft (9A, 9B) and movable axially under the action of said ramps (14, 16), the clutch plate (15) being adapted to be coupled to or uncoupled from the secured member (18, 19) during movement of the clutch plate (15).

5. The transmission box (3) according to claim 4, wherein the ramps (16) of one surface of the clutch plate (15) coact, during the clutching phase, with the ramps (14) of the drive wheel (8) for axial movement of the plate (15) in a first direction of securement in rotation of the plate with the secured member (18), which is a wheel (18) secured in rotation with the wheel (2A, 2B), the ramps (17) on the other surface of the clutch plate (15) coacting, during the unclutching phase, with ramps (20) on the secured wheel (18), to give rise, by axial movement in a direction opposite said clutch plate (15), to the free wheeling of the drive shaft (9A, 9B) of the wheel (2A, 2B).

6. The transmission box (3) according to claim 4, wherein the ramps (16) on one surface of the clutch plate (15) coact, during the clutching phase, with the ramps (14) on the drive wheel (8) for axial movement of the plate (15) in a first direction for securement in rotation of the plate with a pin (19) mounted on the drive shaft (9A, 9B) and secured in rotation with the wheel (2A, 2*b*), the ramps (17) on the other surface of the clutch plate (15) coacting, during the unclutching phase, with opposite legs of said pin (19) to give rise, by axial movement in a direction opposite said clutch plate (15), to the free wheeling of the drive shaft (9A, 9B) of the wheel (2A, 2B).

7. The transmission box (3) according to claim 1, wherein the motor input shaft (4) is an endless screw or a cylindrical/conical pinion.

8. The transmission box (3) according to claim 1, wherein the drive shaft (9A, 9B) comprises two half shafts (9A, 9B), and the transmission box (3) further comprises, disposed in line with the drive wheel (8) and connected to an end of the half shaft, means (12, 23, 24) for holding in aligned position the half shafts (9A, 9B), these half shafts (9A, 9B) being, in a condition held aligned, adapted to be driven with relative rotational movement.

9. The transmission box (3) according to claim 8, wherein the means for holding in aligned position the half shafts (9A, 9B) are constituted either by a connection member, formed from an axle (12) or a sleeve (24) coacting by nesting with a free end to hold aligned each half shaft (9A, 9B), or by complementary geometric shapes of free ends to hold aligned the half shafts (9A, 9B), these geometric forms permitting mounting with nesting and free rotation of the two half shafts (9A, 9B) relative to each other.

10. A wheeled machine (1) provided with the transmission box according to claim 1.

11. A walking type wheeled machine provided with the transmission box according to claim 1.

12. A lawnmower provided with the transmission box according to claim 1.

13. The transmission box (3) according to claim 1, wherein the brake (21) is constituted by a simple leaf spring adapted to be applied to an edge of the clutch plate (15).

* * * * *